United States Patent

[11] 3,583,457

| | | |
|---|---|---|
| [72] | Inventor | Leslie Vadas<br>Los Gatos, Calif. |
| [21] | Appl. No. | 837,752 |
| [22] | Filed | June 30, 1969 |
| [45] | Patented | June 8, 1971 |
| [73] | Assignee | Castle & Cooke, Inc.<br>Honolulu, Hawaii |

[54] TANDEM KNIFE STRIP PEELING HEAD
9 Claims, 29 Drawing Figs.

[52] U.S. Cl............................................. 146/241,
146/6, 146/43
[51] Int. Cl............................................. A23n 7/00
[50] Field of Search............................... 146/6, 241,
43

[56] References Cited
UNITED STATES PATENTS
3,382,900  5/1968  De Back ..................... 146/6
3,460,596  8/1969  Vadas........................... 146/6

*Primary Examiner*—Willie G. Abercrombie
*Attorneys*—F. W. Anderson and C. E. Tripp

ABSTRACT: A rotary head pineapple peeler has superposed tandem peeling knives which simultaneously make the skin and juice cuts with minimum disruptive force on the pineapple body. The knives incorporate peel guides which cooperate with superposed discharge openings in the peeling head body for separate delivery of the skin and juice cuts to a conveyor.

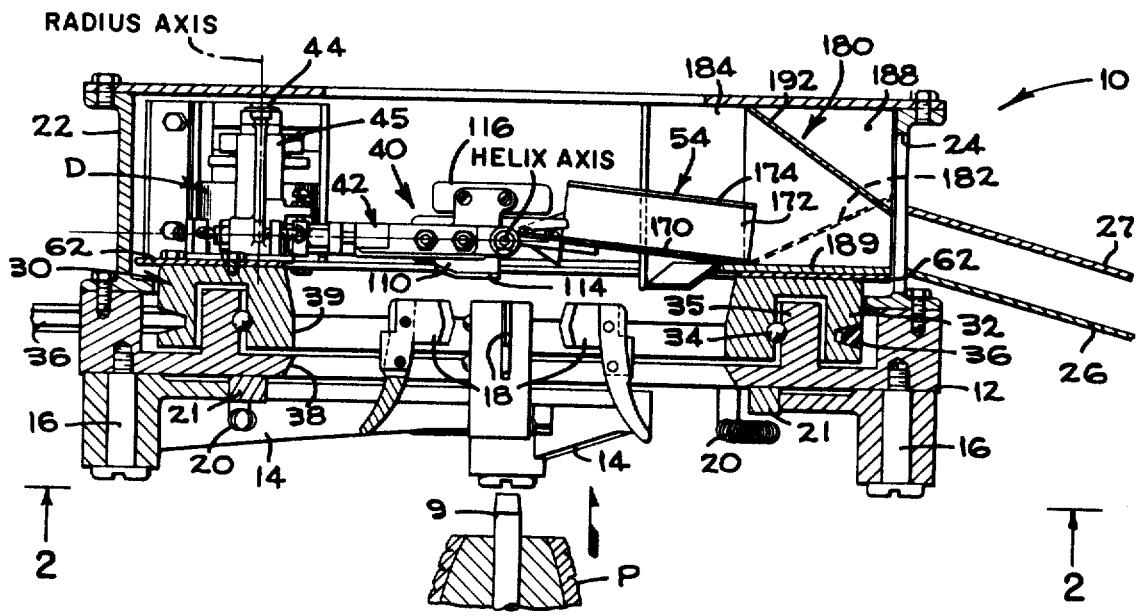
FIG_1
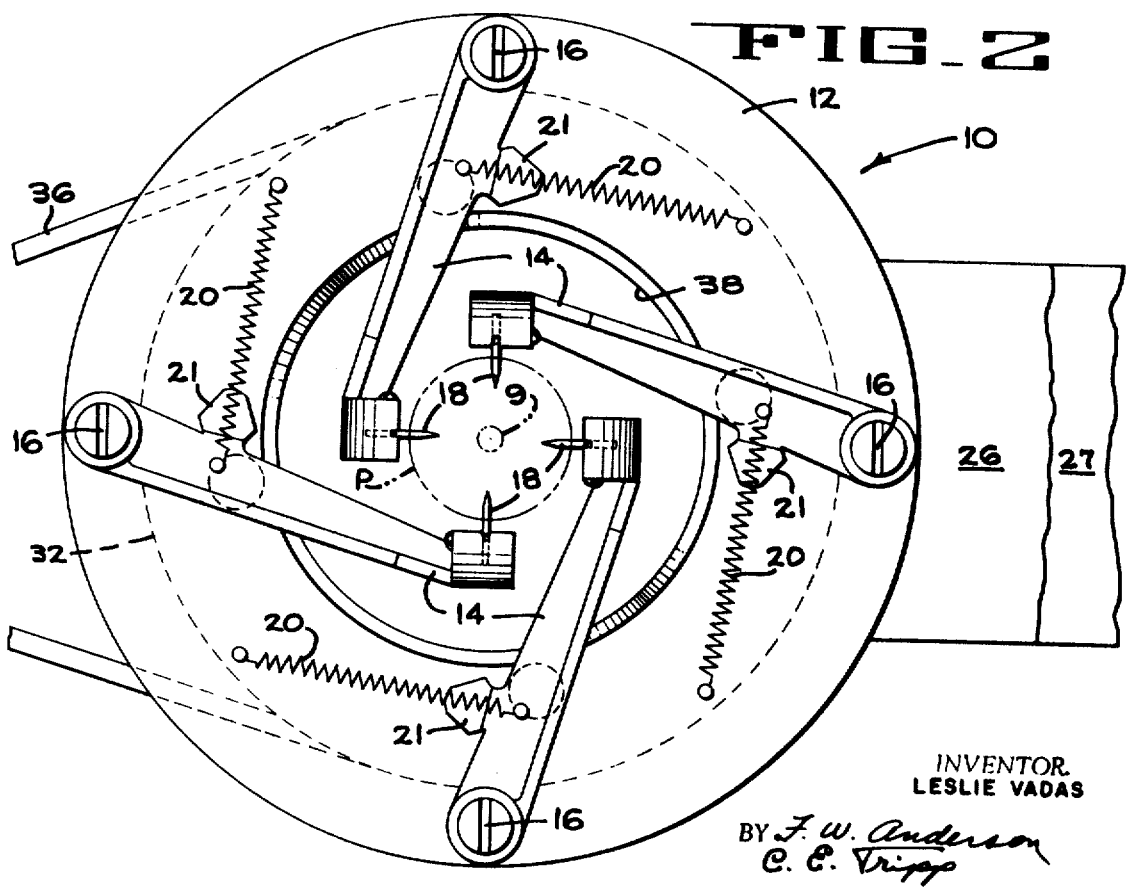
FIG_2
INVENTOR.
LESLIE VADAS
BY F. W. Anderson
C. E. Tripp
ATTORNEYS

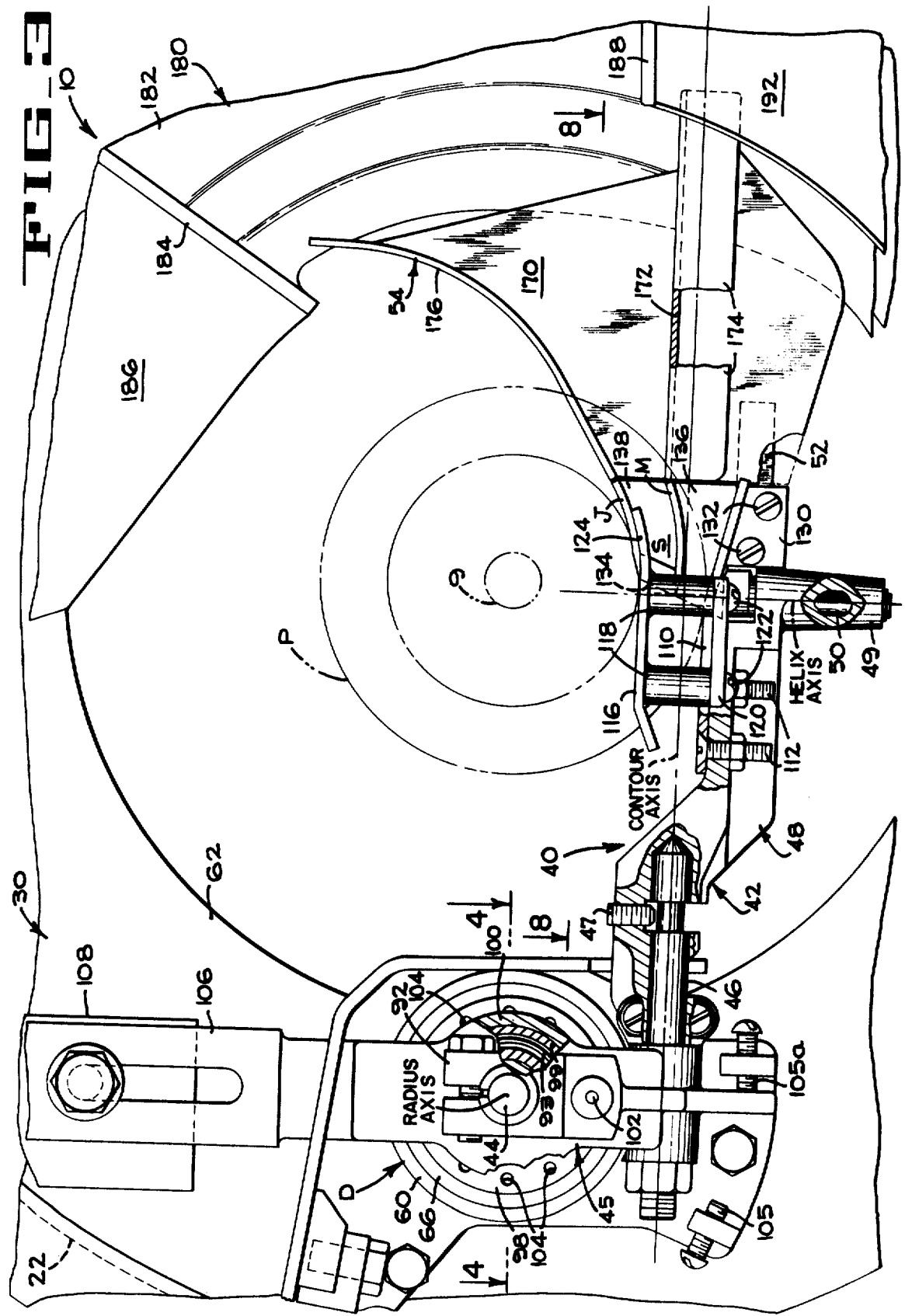

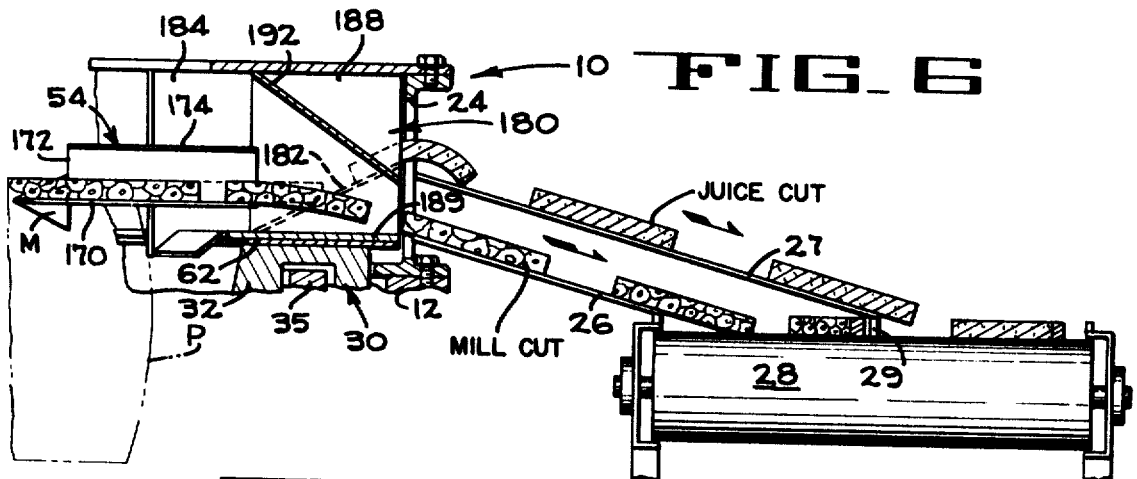
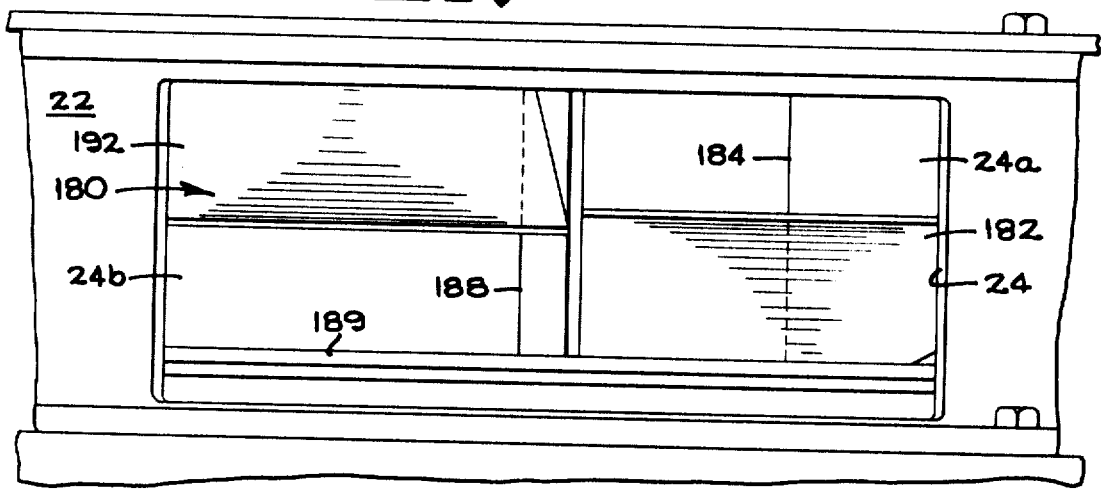
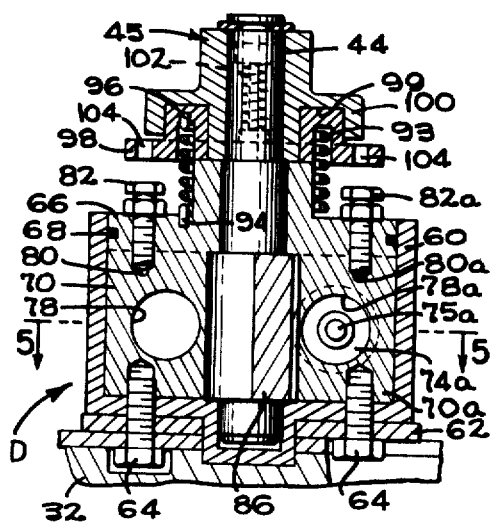
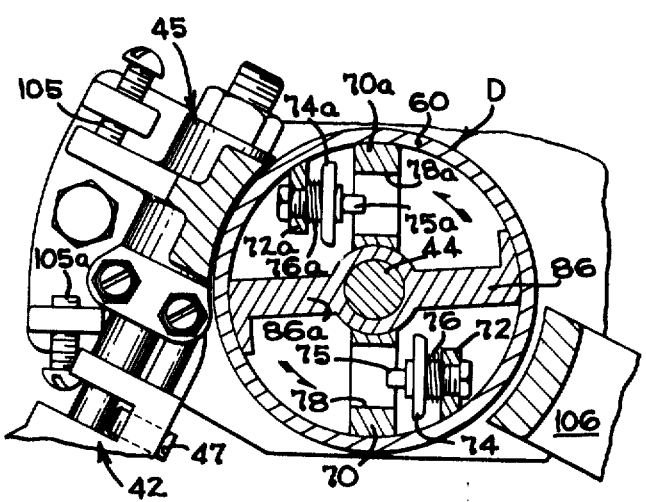

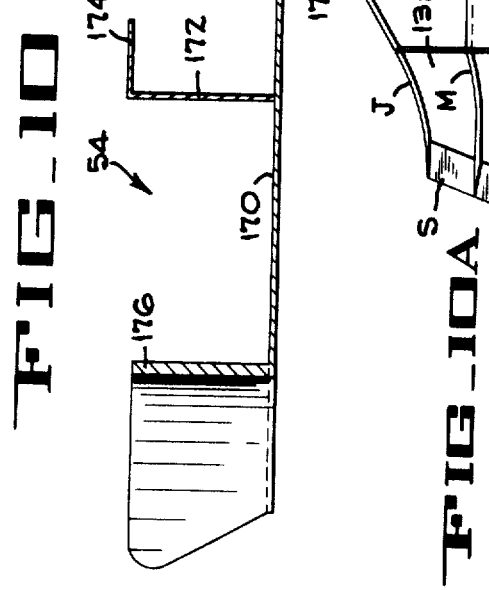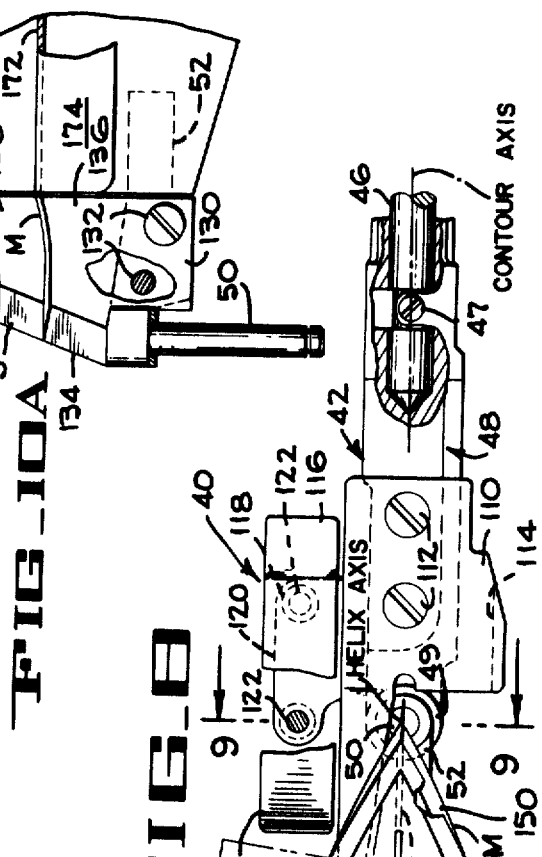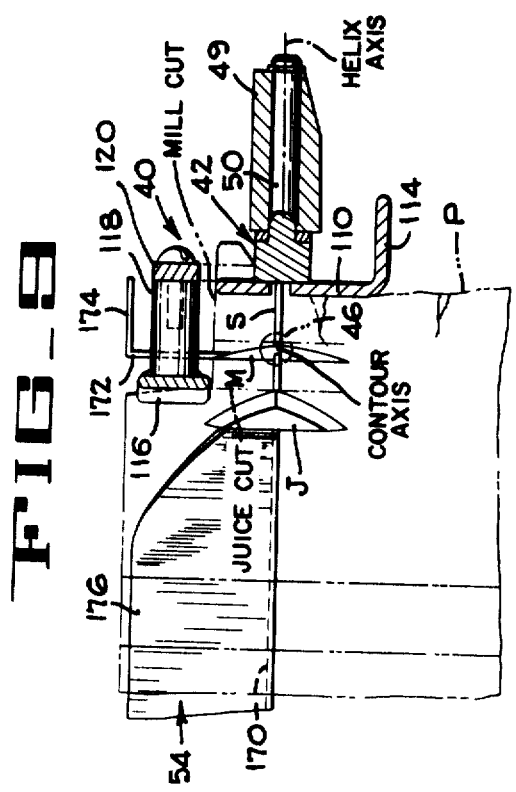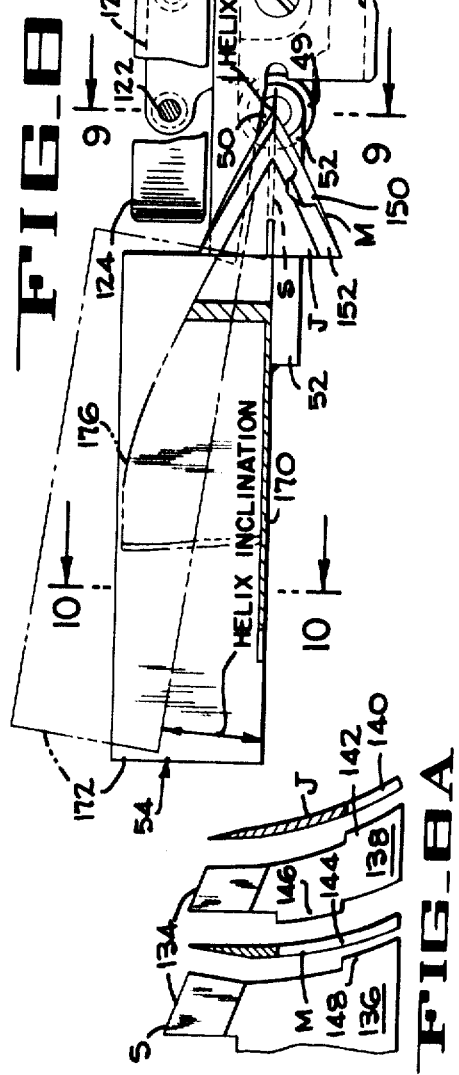

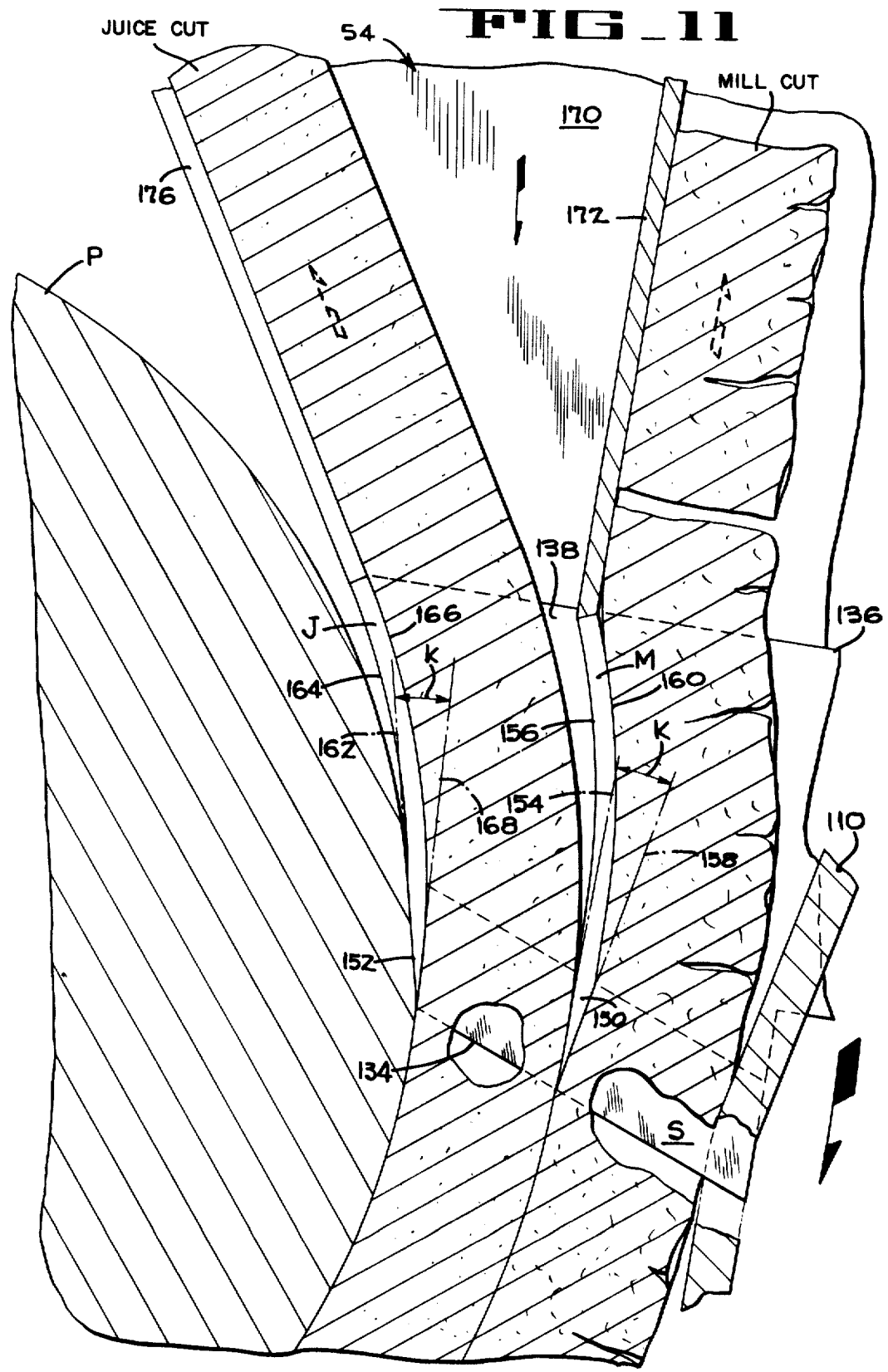

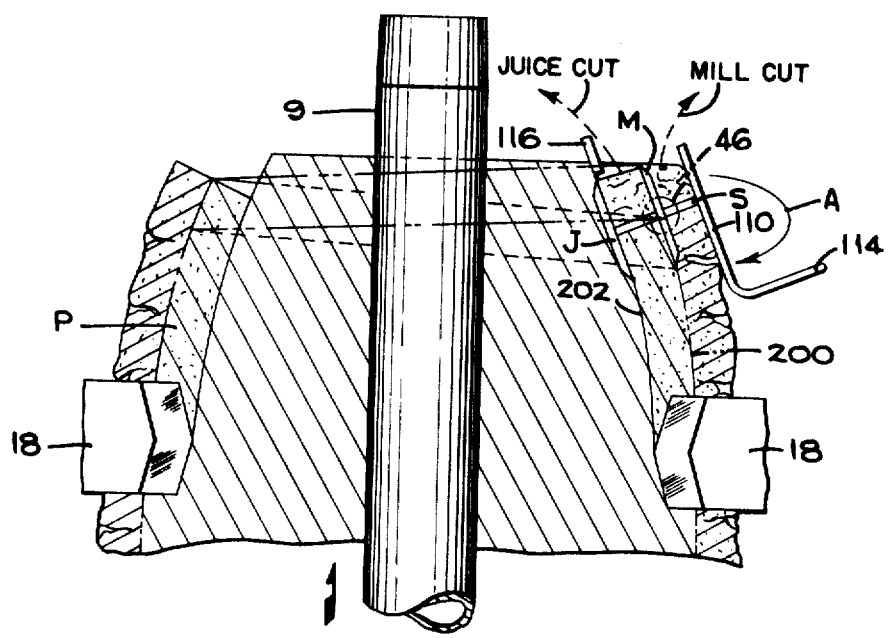
FIG_14
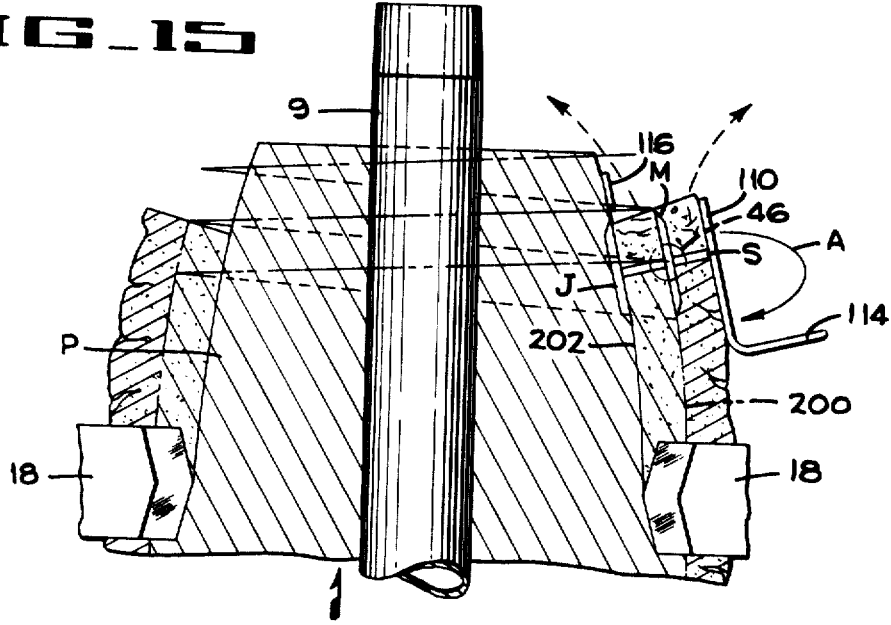
FIG_15

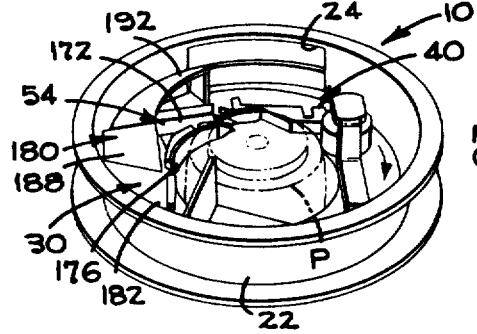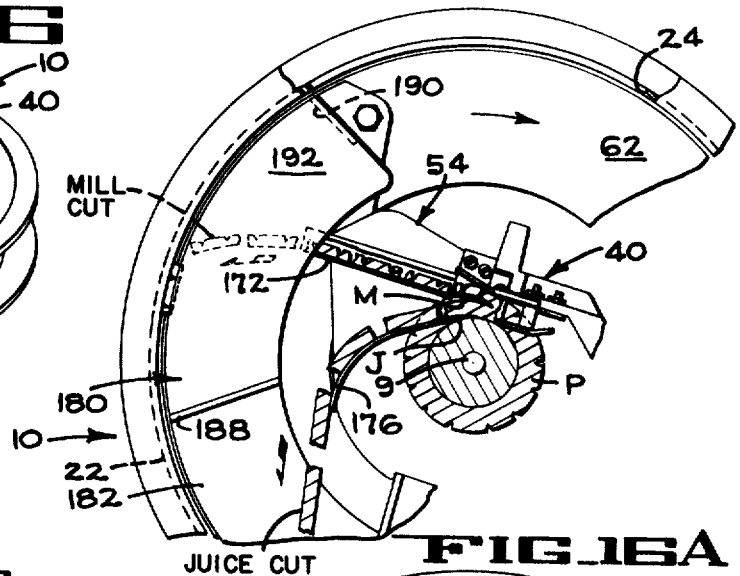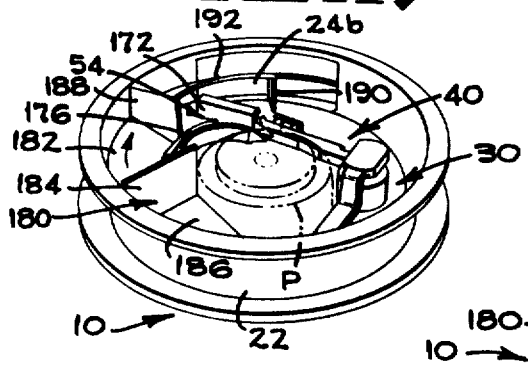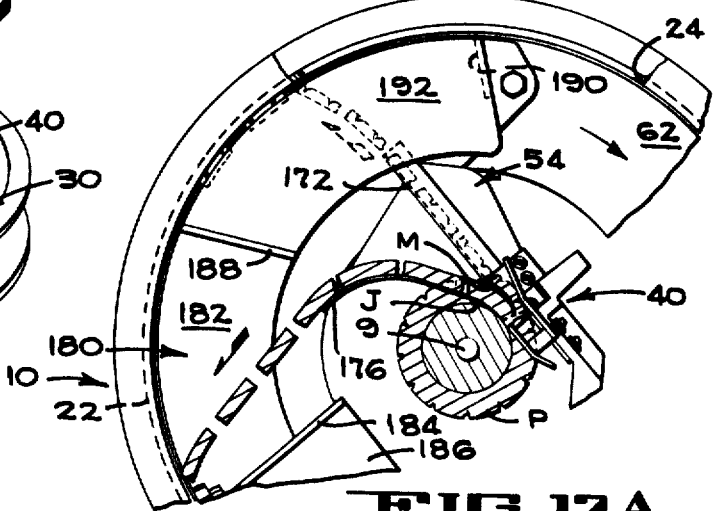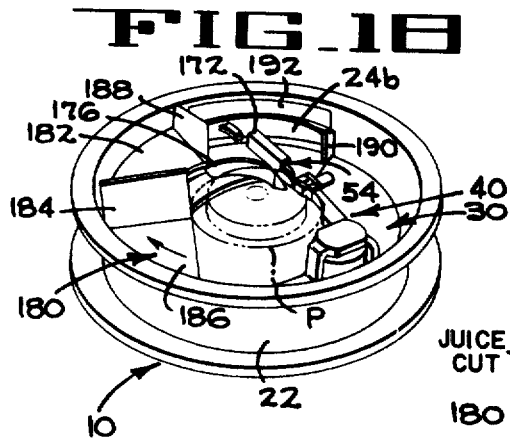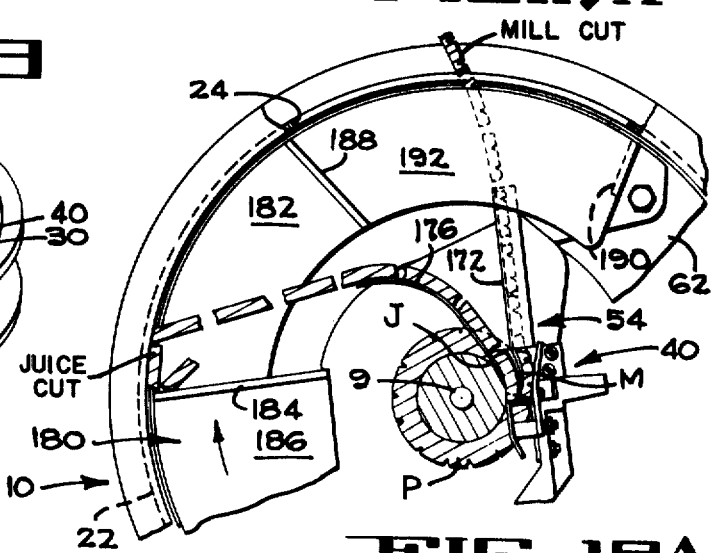

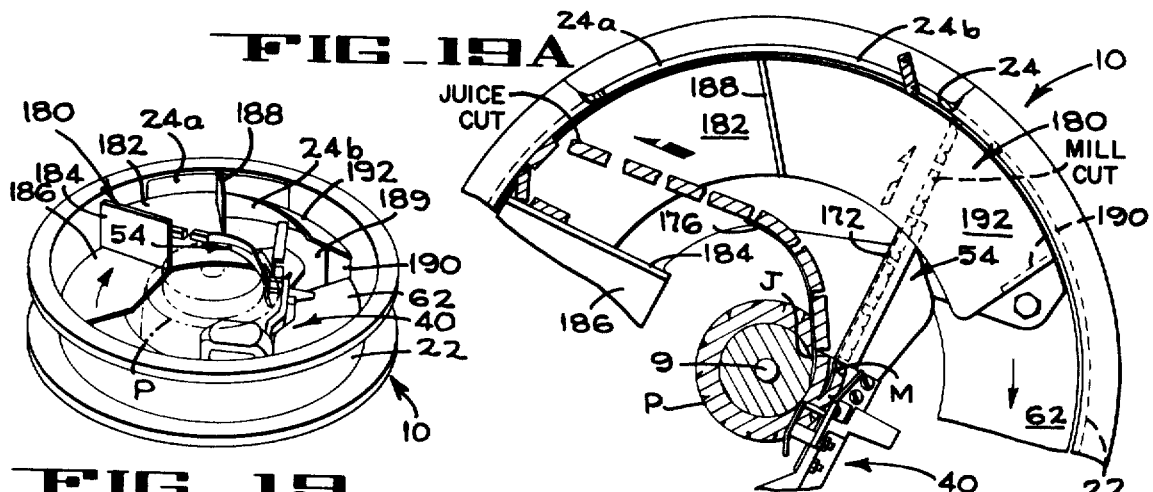
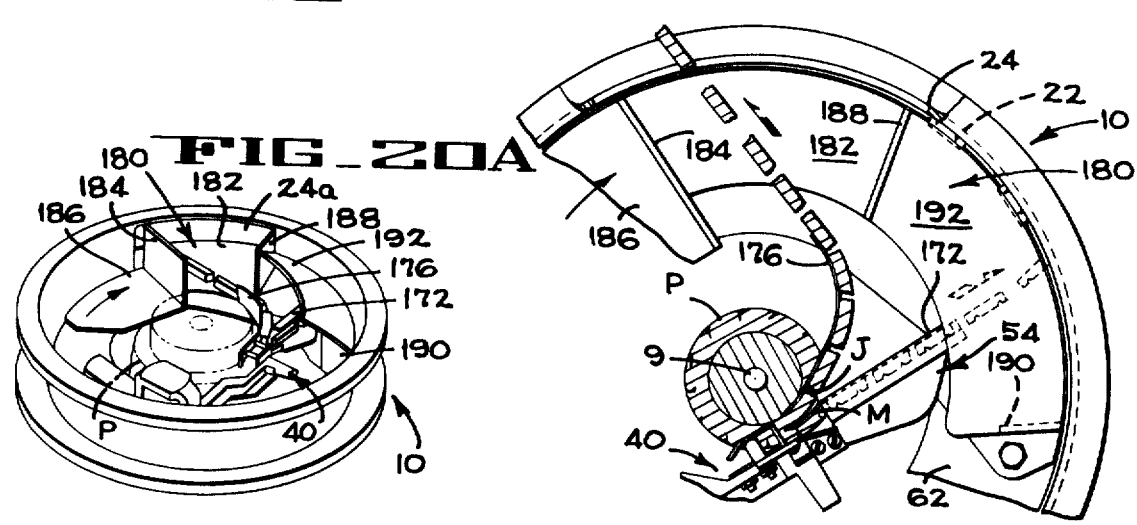
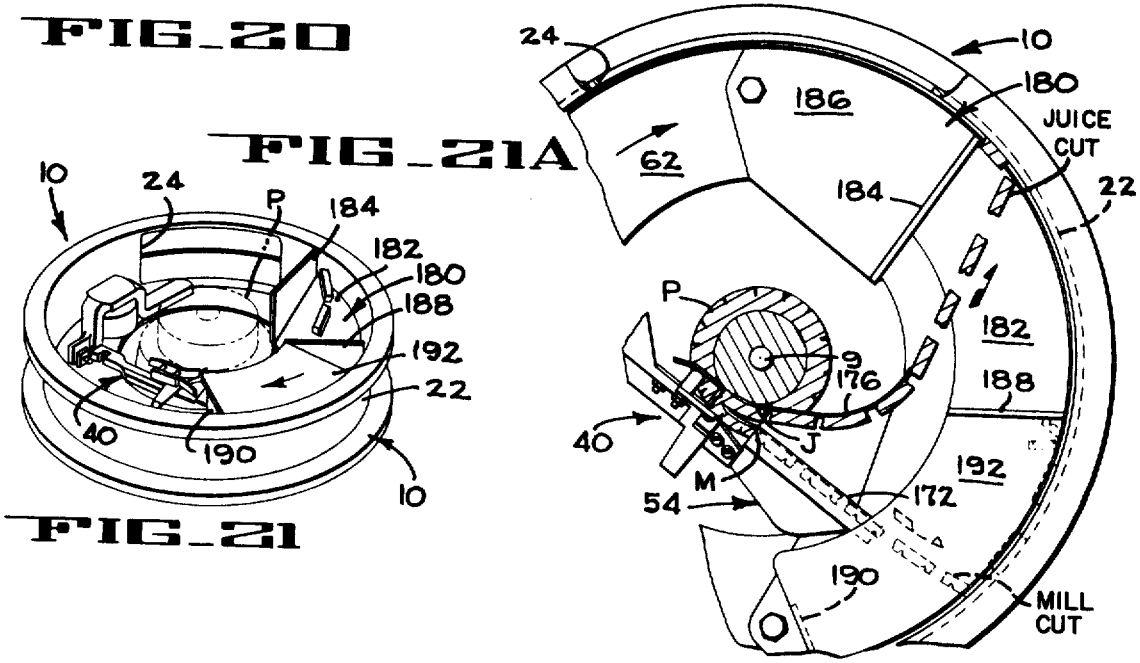

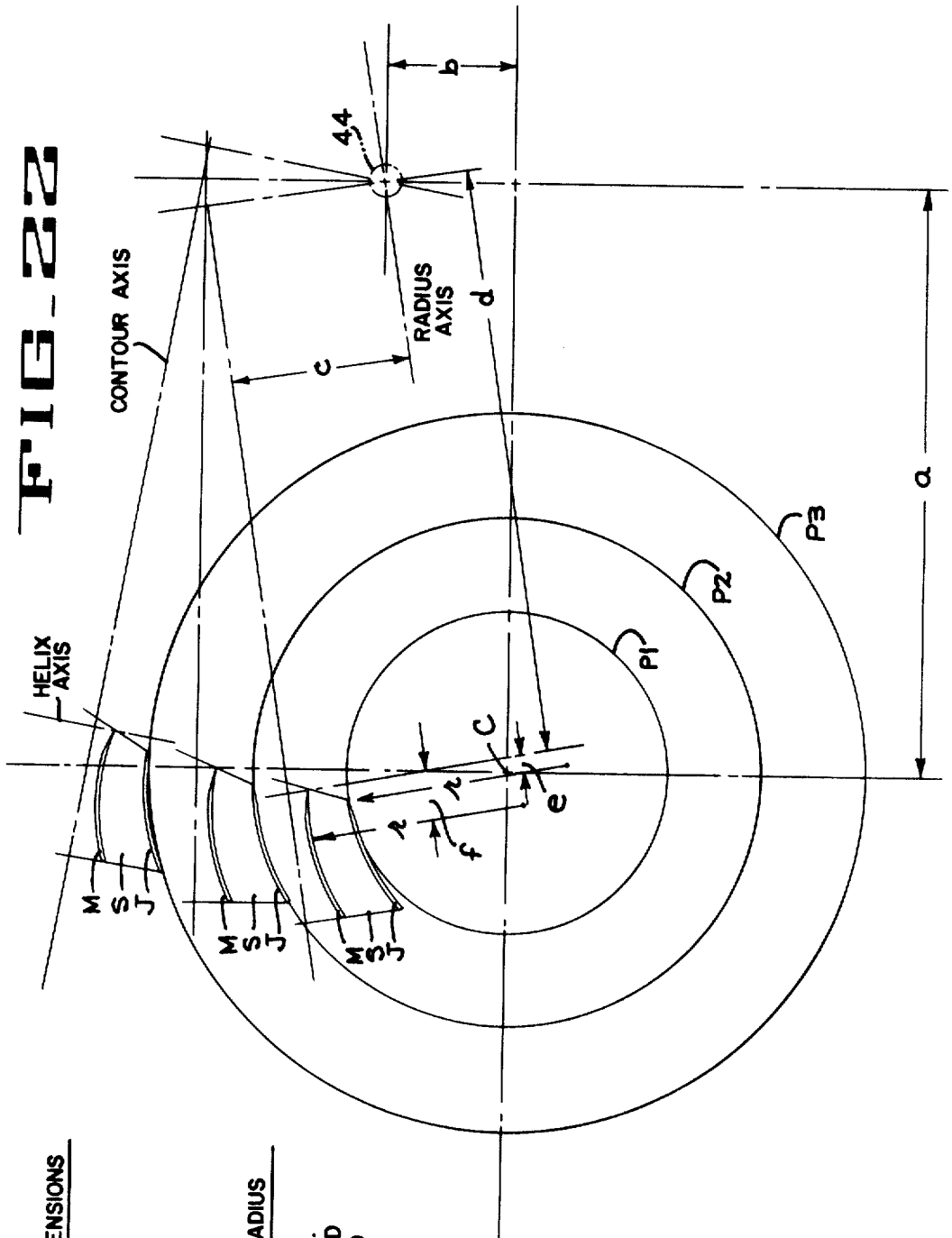

TANDEM KNIFE STRIP PEELING HEAD

BACKGROUND OF THE INVENTION

This invention relates to the contour peeling of fruit having thick hard skin, such as pineapples or the like, and more specifically to a method of peeling pineapples employing a tandem knife rotary peeling head.

The rotary peeling head of the present invention forms a double cut contour peeling operation on pineapples such as the head disclosed in the U.S. Pat. No. 3,382,900 to DeBack filed May 14, 1968, assigned to Castle & Cook, Inc. and the copending U.S. Pat. application Ser. No. 731,237 to Vadas for Damped Rotary Peeling Head, filed May 26, 1968 and assigned to the FMC Corporation, now U.S. Pat. No. 3,453,677. The peeling head of the present invention performs a double cut contour peeling operation similar to that of the aforesaid disclosures but represents an improvement in the head that is attained by a tandem knife construction.

DESCRIPTION OF THE PRIOR ART

In the prior contour peeling devices as exemplified by the aforesaid patent and copending application, pineapples are pushed up through an opening in the base of a rotor at which nonrotating peel slitters are mounted. The slitters axially slit the skin of the pineapple, as well as supplying the torque necessary to hold the pineapple against rotation, in response to the forces imparted to the pineapple by the rotary peeling knives. In these prior heads, a pineapple moving up through the peeling head first encounters a mill cut knife assembly which peels away the eyes of the pineapple underneath the skin. These knives are displaced circumferentially about 180° around the pineapple.

Experience with the peeling heads of the type described above and analysis of the results reveals that these prior constructions have several disadvantages, namely:

a. The second or juice cut knife is spaced axially above the first (mill cut) knife by an axial extent equal to the height of one triangular under cut knife. This axial displacement of the knife assemblies places the second or juice cut knife set entirely against a peeled body of the pineapple, which portion is unsupported by the tough skin because the latter has been removed by the mill cut knife. As a result of this, tearing and chunking occasionally occur at the juice cut knife, particularly since the pineapple is rotated at a relatively high speed, in the order of 500r.p.m.

b. As mentioned above, the slitters which are just below the first or mill cut knife assembly, supply the torque necessary to hold the pineapple against rotation under the forces of the peeling knives. As mentioned above, in the prior constructions previously described, the second or juice cut knife assembly is axially displaced from the slitters by the total width of a triangular undercut blade, and the juice cut knife is located at a completely peeled body portion of the pineapple. As a result of this characteristic of the prior constructions, the torque imparted to the pineapple body by the second or juice cut knife assembly against the restraint of the slitters, occasionally twists the upper, completely peeled body portion of the pineapple off from the lower portion thereof, because the lower portion is not only closer to the slitters but is still partially reinforced by the tough skin of the pineapple.

c. As mentioned, in the aforesaid prior construction, the first and second peeling knife assemblies are spaced around the pineapple by approximately 180°. The two knives are spring pressed against the pineapple so that they will follow its contour and maintain a gauged peel depth. As a result of this arrangement of prior peeling heads, the knives apply a force couple to the pineapple about an axis perpendicular to that of the pineapple. This couple tends to cant the pineapple in the peeling head and reduce the precision of the peeling operation, even through a core rod is provided.

d. Another characteristic of prior peeling heads is that the second or juice knife cut assembly has both of its gauges pressing against peeled portions of the pineapple which portions are relatively soft and do not present firm, strongly adherent gauge faces to the gauges during rotation of the pineapple.

SUMMARY OF THE INVENTION

The disadvantages of prior peeling heads outlined above are all overcome in a simple and effective manner by using a single knife assembly having a knife mounting leg that extends across the opening through which the pineapple is pushed, which leg mounts superposed tandem knives for simultaneously making both the mill and juice cuts at the same radial location. With this construction, since the knives are superposed and hence at the same axial location along the pineapple, the juice cut peeling operation takes place immediately beneath the skin or mill cut peeling operation. Thus at the point of cutting, the juice cut portion of the pineapple just ahead of the knives is backed up by the unremoved skin of the pineapple, thus eliminating chunking and tearing at the cutting zone of the juice cut knife. Thus disadvantage (a) as outlined above is overcome by the present construction.

Disadvantage (b), namely twisting of the peeled pineapple body from the remainder of the pineapple by the juice cut knife, is obviated because the juice cut knife is axially aligned with the mill cut knife and hence the strengthening action of the tough pineapple skin is available to resist the effects of torque on the peeled pineapple body. Also, in the present tandem knife construction, both knives are relatively close to the slitters so that the latter can more effectively resist twisting of the pineapple under the torque applied by the knives.

Disadvantage (c), outlined above (application of a force couple tending to cant the pineapple), is obviated because the radial force exerted by the spring that presses the tandem knife against the pineapple is taken by the pineapple at only one axial zone and thus represents a simple radial force against the pineapple rather than a canting couple. This radial force is readily resisted by the slitters and by a fixed core rod that is within the cored pineapple.

As to the prior constructions wherein both gauges for the juice cut knife engage peeled portion of the fruit. The other gauge (the lower gauge in a vertical type machine) rides against the tough pineapple skin which is substantially immune to damage. Thus, with one gauge firmly guided by the pineapple skin, and since the upper gauge is connected to the same swiveled body, the upper gauge does not gouge or dig into the fruit despite the relatively high speed of rotation of the fruit during peeling.

Other features on the invention including peel diverging extensions from the tandem juice cut knives so disposed as to separate the peels or cuts from each knife for independent collection and processing.

Another feature of the present invention is the provision of a common peel slitting knife that intersects the mill and juice cut knives at substantially 90° and where the axis of the tangential pivot of the knife assembly intersects the junction of the aforesaid slitting knife with the mill cut knife.

The aforesaid briefly mentioned features of the approved peeling head of the present invention will operate to minimize waste and to provide peeling at a relatively high production speed.

BRIEF DESCRIPTION OF THE DRAWINGS

FIG. 1 is a vertical section through a peeling head embodying the invention.

FIG. 2 is a bottom view of the peeling head looking along line 2-2 of FIG. 1.

FIG. 3 is an enlarged fragmentary plan of the tandem knife arm assembly.

FIG. 4 is a vertical section through the knife arm damper taken along line 4-4 of FIG. 3.

FIG. 5 is a horizontal section through the damper taken along line 5-5 of FIG. 4.

FIG. 6 is a fragmentary vertical section showing the peel discharge.

FIG. 7 is an outside view of the discharge window.

FIG. 8 is a side elevation of the knife arm assembly taken in the direction of line 8-8 of FIG. 3.

FIG. 8A is a fragmentary diagram showing the assembly of the knives.

FIG. 9 is a vertical section through the knife arm assembly taken on line 9-9 of FIG. 8.

FIG. 10 is a vertical section through the guide chutes taken along line 10-10 of FIG. 8.

FIG. 10A is a fragmentary plan view showing the details of the tandem knife assembly.

FIG. 11 is an enlarged diagram showing the cutting action of the tandem knives.

FIGS. 12—15 are diagrams illustrating the progressive peeling action of the knives.

FIGS. 16—21 are perspective views showing the peeling and discharging operations.

FIGS. 16A—21A are corresponding and somewhat enlarged plan views of the operations shown in FIGS. 16—21.

GENERAL CONSTRUCTION OF THE PEELING HEAD

Figure 12:
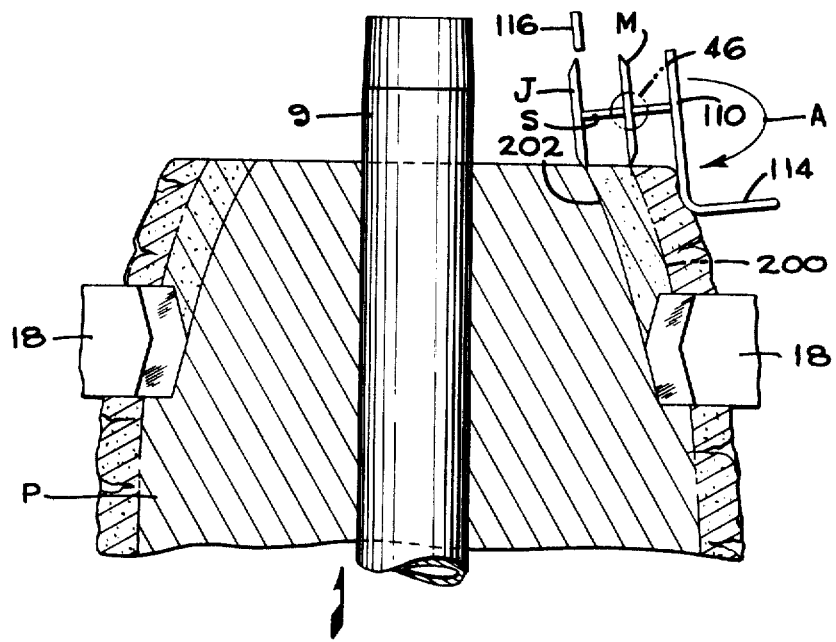

The peeling head of the present invention is generally like that of the aforesaid Vadas application and the DeBack patent, except for the incorporation of the tandem knife assembly of the present invention.

Referring generally to FIGS. 1 and 2, the cored but unpeeled pineapple P is introduced vertically from beneath on a core rod 9, as shown at the bottom of FIG. 1. The structure for pushing the pineapple up through the head is not shown, the details thereof not being essential to the invention. The DeBack patent shows a suitable pusher in FIG. 9. The peeling head 10 is generally annular and has a rotor mounted for rotation about the pineapple. The peeling head includes an annular base 12 which is stationary and mounted on the machine frame (not shown). In order to assist in preventing rotation of the pineapple during peeling as well as to break up the peel strips into segments, the peeling head assembly 19 includes four slitting knives. These are mounted on the underside of the peeling head base 12 by means of arms 14 on peripheral axial pivots 16. The arms carry radially projecting blades 18, which make axial slits around the circumference of the cored pineapple P as it is forced upwardly through the peeling head assembly guided by core rod 19. The slitting blades are urged into the pineapple by tangential springs 20 (FIG. 2), and their depth of cut is limited by stops 21.

Projecting upwardly from the annular base 12 is a peel confining barrel 22 (FIGS. 1, 6, 7 and 13) having a radial opening 24 from which extends a mill cut chute 26 and a juice cut chute 27, leading to a takeaway conveyor 28, (FIG. 6) having a divider strip 29. Rotating within the barrel 22 is a peeling rotor assembly indicated generally at 30 and having a channeled annular base 32 (FIG. 1) mounted on bearings 34. The bearings run in an outer race 35 projecting upwardly from the fixed annular base 12. The rotor assembly 30 is rotated by a V-belt 36 and a drive motor, now shown. The base 12 and the rotor 30 are centrally apertured at 38, 39, respectively, to accommodate upward motion of the pineapple P through the head. The mill and juice cuts are made by a tandem knife assembly indicated at 40, forming part of the present invention.

GENERAL KNIFE ARM CONSTRUCTION

Contrary to the previously mentioned DeBack and Vadas constructions, the knife assembly 40 of the present invention embodies a single knife arm mounting tandem peeling blades. The knife arm is indicated generally at 42 and is of an L-shaped construction as best seen in FIG. 3. The knife arm assembly is designed for swiveling or pivoting about three axes in order to accommodate variations in the radius of the pineapple being peeled, the contour of the pineapple, and the helix angle of the cuts around the pineapple.

The radius axis of the knife arm 40 is parallel to the axis of rotation of the peeling head and of the pineapple and is formed by a radius pivot 44 for a knife arm hub 45 and about which the L-shaped arm 42 swings during peeling.

The contour axis of the peeling knives is generally horizontal and tangent to the pineapple and motion about this axis is provided by a pivot 46 (FIG. 3) that projects from the hub 45. A tangent knife leg 48 swivels on the contour pivot 46 and is removably retained on that pivot by a set screw 47 or by any other suitable quick detachable locking device.

In order that the peeling knives can accommodate themselves to the helix angle of the peeling cut about the helix axis, a post 49 projects radially outward from the cutting end of the tangent knife arm 4 (FIG. 3). Pivotally mounted in the helix post 49 is a helix pivot 50 which projects radially outward from a knife mounting bracket 52 and it is this pivot that accommodates the helix inclination of the knife during peeling as indicated in dotted lines at the last of FIG. 8. The helix inclination required to provide a helical peeling cut is also shown in the diagrams of FIGS. 14 and 15 and all of the axes just described are shown in a geometrical diagram of the preferred embodiment found in FIG. 22. The helix post 50 also appears clearly in FIGS. 9 and 10A.

The knife mounting bracket 52 has secured thereto a vertical mill cut peeling blade M, a vertical juice cut peeling blade J and a horizontal peel slitting blade S. A discharge peel guide assembly indicated generally at 54 projects rearwardly from the knife assembly blades M, J and S for distributing the peels to a rotating discharge assembly and out of the opening 24, FIG. 6 and FIGS. 16 to 21A. The detailed construction of the knife assembly and the discharge guide assembly will be described presently.

DAMPER CONSTRUCTION

A damper D is provided at the hub 45 of the knife arm, which damper is of the double vane hydraulic type with one way relief action on radially inward knife motion and throttling (damping) action on radially outward knife motion. The details of the damper are not essential to the present invention and the damper employed is like one of the two described in the aforesaid Vadas application. However, enough of the damper will be described to indicate its general mode of operation.

The damper D has a cup shaped housing 60 (FIG. 4) fastened to an annular knife assembly mounting plate 62 (FIG. 3) by screws 64 (FIG. 4). A cover plate 66 (FIGS. 3 and 4) closes the top of housing 60 and is sealed thereto by an O-ring 68 (FIG. 4). The housing 60 and the cover plate 66 cooperate to provide a hydraulic chamber.

Depending from the cover plate 66 are diametral fixed partitions 70, 70a which are disposed on a radius of the rotor. Also depending from the cover 66 are relief valve mounting ears 72, 72a (FIG. 5) mounting relief valves 74, 74a on pins 75, 75a. The relief valves are urged by springs 76, 76a to close ports 78, 78a in the fixed partitions 70, 70a (FIG. 5).

The partitions 70, 70a also are pierced with throttling ports 80, 80a (FIG. 4) which bypass a metered quantity of oil on the throttling (knife moving out) stroke of the damper. The area of the throttling ports 80, 80a is adjustable by metering screws 82, 82a.

Oil transfer through the release and throttling ports is effected by a double acting vane having wings 86, 86a, projecting from the pivot shaft 44 (FIG. 5). The peripheral edges of the vanes make a nice fit with the inner wall of the housing 60 so that oil in the housing is trapped between the wings and the fixed partitions 70, 70a. In operation, the knife arm can readily move inwardly to follow the pineapple contour (as indicated by the arrows in FIG. 5) because the valves 74, 74a open. Bouncing back of the knife arm is resisted because the relief valves close and outward motion of the knife arm must be accommodated by oil flow through the metering ports 80, 80a (FIG. 4). This action is described in detail in the Vadas application and is not claimed herein.

The bell crank hub 45 is clamped to the pivot (damper vane) shaft 44 by a split clamp construction 92. This permits the damper vane to be centered between the partitions 70, 70a when the knife arm 42 is set at some nominal position.

The damper incorporates a torsion spring 93 (FIGS. 3 and 4) which urges the knives towards the pineapple. The spring 93 is a helical torsion spring connected between the bell crank hub 45 and the damper housing 60. Means are provided for adjusting the force of this spring for optimum action at a nominal pineapple diameter, and this construction can be described as follows:

The spring 93 has a bent lower leg 94 (FIG. 4) that projects into a socket in the cover 66 of the damper, and a bent upper leg 96 that projects into a socket in a windup collar 98. The position of the collar 98 relative to the damper housing determines the torsion force of the spring 93. The collar 98 is rotatably mounted in a groove 99 formed in a flange 100 on the bell crank hub 45. The wind up collar 98 is retained in a selected position by a spring loaded keeper latch 102 (FIGS. 3 and 4) mounted in the hub 45. The lower end of the latch pin projects into any one of a number of holes 104 in the collar 98, (FIG. 3). Thus the pressure on the knife against the fruit can be set for an optimum value at some nominal fruit diameter by adjusting the windup collar 98 as just described. Adjustable stops 105, 105a (FIG. 3) limit the swing of the knife arm.

As seen in FIG. 3 and as explained in detail in the aforesaid Vadas application, the knife bell crank hub 45 has a counterweight leg 106 which adjustably mounts a counterweight 108. The counterweight urges the knives M and J against the fruit due to centrifugal force, but its effect is least on the largest fruit for reasons explained in the Vadas application.

TANDEM KNIFE GAUGES

Reference has been made to the tandem knife and peel discharge construction mounted on the knife mounting bracket 52. The essential details of these constructions will now be explained.

Before describing the knives themselves, reference will be made to combined depth of cut and contour gauges provided in the knife assembly. These gauges are mounted on the tangent knife arm 48 (see FIGS. 3, 8 and 9) and hence partake of the motion of the knife arm about the radius axis pivot 44 and about the contour axis pivot 46 but not about the helix axis pivot 50. The gauges include outer gauge 110 which is secured to the tangent knife arm 48 by means of flathead screws 112 (FIG. 3) and which has a rearwardly projecting peel guiding lip or extension 114. (FIGS. 3 and 9). The gauge 110, as seen in FIG. 9 rides against the periphery or outer skin of the pineapple P being peeled.

Mounted above, but radially inwardly of the outer or peel gauge 110 is an inner gauge 116 for engaging the peeled flesh of the pineapple as seen in FIG. 9. The gauge 116 has welded thereto mounting posts 118 which are secured to an upwardly projecting ear 120 of the tangent arm 48 by means of screws 122. The trailing end 124 of the gauge 116 (FIG. 3) is disposed above the juice cut knife J (FIG. 9) but matches the contour of that knife (FIG. 3). Thus, the gauges 110 and 116 not only determine the depth of cut but cause the tangent knife arm 48 to swivel about the contour pivot 46 and hence follow the contour of the pineapple as best seen in FIGS. 12— 15. As can be seen in FIG. 9, the force of the spring 93 that urges the knife assembly against the pineapple, as well as the reactions of the pineapple on the knife arm, is primarily taken by the gauge 110 which has a large surface that engages the outer, tough skin of the pineapple. The upper gauge 116 (FIG. 9) need only cooperate with the outer gauge 110 to swivel the tangent knife arm 48 about the contour axis on the contour pivot 46 (FIG. 3).

TANDEM KNIFE ASSEMBLY

As mentioned, the tandem knife assembly includes vertical mill and juice cut knives M & J and a slitting knife S. The slitting knife S extends inwardly horizontally and has a radially outer flange 130 (FIGS. 3 and 10A) that is secured to the knife mounting bracket 52 by means of screws 132. The slitting knife S has a leading beveled cutting edge 134 (FIGS. 3 and 8).

FIG. 8A is a diagram showing how the knives S, M and J are put together. The slitting knife S is actually made in two complimentary parts, a radially outer part 136 and a radially inner part 138 (see also FIG. 3). The juice cut knife J is notched at 140 to receive a tang 142 on the inner slitting knife part 138. The mill cut knife end is notched at 144 to receive an oppositely projecting tang 146 on the inner slitting knife part 138 as well as a tang 148 projecting from the trailing end of the outer slitting knife part 136. When these parts are all assembled, the juice and mill cut knives can be silver soldered or brazed to provide a unitary assembly which is mounted by means of the slitting knife flange 130 (FIG. 3) to the knife mounting bracket 52 by the screws 132, as previously described.

The mill cut knife M is triangular in shape as seen in FIG. 8 and has a sharpened V-edge 150 formed as a bevel on the radially outer side of that knife (FIG. 11). The juice cut knife J is also triangular in shape and has a sharpened V-edge 152 which is formed by a bevel on the radially inner side of that knife (FIG. 11).

As seen in the enlarged diagrammatic view of FIG. 11, the angle of the sharpened edge 150 of the mill cut knife M forms a small angle "$k$" of about 10° with a tangent to the inner edge of the knife. The sharpened edge 152 of the juice cut knife J is formed at the same angle "$k$" of 10°.

The enlargement of FIG. 11 shows some other geometrical details of the construction of the peeling knives. The radially inner side of the cutting edge of the mill cut knife M lies in a plane 154 forming one side of the knife edge angle "$k$" previously described. This plane is tangent to and merges with a curved inner face 156 of the knife. The plane 158 of the radially outer doubled edge 150 of the mill cut knife M forms the aforesaid angle with the previously mentioned inner plane 154 and this plane intersects the curved outer side 160 of the mill cut knife. The wedge cutting edge construction just described urges the knife arm radially inwardly during the cut and assists in separating the mill cut from the flesh of the pineapple.

A somewhat reversed construction is provided for the juice cut knife J. In this knife, the radially inner face of the bevel cutting edge 152 lies in a plane 162 which intersects the curved radially inner face 164 of the knife. The outer, curved side 166 of the knife intersects the inner plane 162 at the tangent plane 168, which forms the angle "$k$" with the inner plane 162. With this construction a wedging action takes place at the juice cut knife which opposes and substantially counterbalances the wedging action previously described which takes place at the mill cut knife M, so that the knife assembly is substantially "neutral" or balanced relative to radial peeling forces.

DISCHARGE GUIDE ASSEMBLY

As previously mentioned, a discharge guide assembly 54 is provided at the trailing ends of the knife blades for receiving the mill and juice cuts and directing them to a peel discharge throat assembly and out of the peeling head. Referring to FIGS. 3 and 8—10, the guide assembly 54 is formed by a bottom plate 170 (FIG. 8) and which forms a continuation of the slitting blade S. The vertical triangular peeling knives M and J extend equally above and below the plate 170 and the slitting knife S so that the lower half of each peeling knife provides an undercut and the upper half of each knife cooperates with the slitting knife S to direct the peels onto the plate 170, as seen in FIG. 11.

Projecting upwardly from the plate 170 is a mill cut partition 172 (FIGS. 3 and 10) having a horizontal shroud 174 for directing the mill cut radially outwardly as the peeling head rotates. The guiding action of the partition 172 is clearly seen in FIG. 11. A juice cut discharge guide 176 also projects up from the plate 170 (FIGS. 3 and 10) and forms a continuation of the curved portion 164 of the juice cut blade J (FIGS. 3 and 11) and guides and directs the juice cut as seen in FIG. 11.

ROTATING DISCHARGE THROATS

A rotating discharge throat assembly 180 will be characterized as a split level discharge device wherein the levels are separated by a partition. The mill cut passes through one level and the juice cut through the other. The assembly 180 (FIGS. 1, 3, 6, 7 and 16 to 21A) is mounted on the rotating peeling head plate 62 for receiving the juice and mill cuts from the discharge guide assembly 54 and directing them out of the peeling head through the opening 24 (FIG. 6). The assembly 180 directs the juice cut upwardly for discharge onto the chute 27 (FIG. 6). The assembly also provides a shield for preventing the mill cut from flying upwardly so that the juice cut will discharge onto the chute 26. To accomplish these results, the assembly 180 is provided with an upwardly inclined floor plate 182 (one level) which leads to the barrel 22 and discharges the juice cut through the opening 24, as the peeling head rotates. The plate 182 has a trailing vertical wall 184 and a horizontal flange 186 for securing the assembly 180 to the annular rotating plate 62. The leading edge of the upwardly inclined plate 182 is bounded by a vertical partition 188 (see FIGS. 3 and 7). As the discharge throat assembly 180 rotates past the opening 24 in the fixed barrel 22, the vertical partition 188 and the upwardly inclined plate 182 provide a juice cut discharge aperture 24a, in the window 24 (FIGS. 7, 19 and 20). The radially inner edge of the juice cut discharge plate 182 is beneath the plate 170 on the knife assembly (FIGS. 1 and 6).

In order to discharge the mill cut, the assembly 180 includes a lower plate 189 (the other level) extending circumferentially and forwardly from the vertical partition 188 and closely skirting the peeler head barrel 22. The leading side of the lower plate 189 is closed by a vertical partition 190, and an upper downwardly inclined shield plate 192 bridges the partitions 188, 190, as the vertical partitions 190 and 188 rotate past the opening 24, these partitions and the lower and upper plates 189, 192 provide a mill cut discharge aperture 24b (FIG. 7) in the opening 24. The throat assembly 180 is so dimensioned and positioned relative to the discharge guide assembly 54 so that regardless of the size of the pineapple being peeled, the guide assembly plate 170 and partition 172 will always discharge the mill cut onto the plate 189, beneath the plate 190 between the partitions 188 and 190 whereas the curved discharge guide 176 and the plate 170 will always direct the juice cut onto the upwardly inclined plate 182.

Actually, as illustrated in the operational views of FIG. 16 to 21A, the peeling head and the discharge assembly 180 rotate past the window 24 formed in the barrel 22 of the head so that the windows 24a and 24b are constantly changing size, during discharge of the cuts therethrough.

THE TANDEM PEELING OPERATION

FIGS. 12—15 are diagrams showing successive stages in the initiation of a tandem peeling operation.

FIG. 12 shows a pineapple P on the core tube 9 as it is being pushed upwardly through the slitting blades 18 which prevent rotation of the pineapple. The peeling knives M, J and S are being rotated around the pineapple as indicated by the arrow A. The stop 105a (FIG. 3) will have been set so that the upwardly moving pineapple will cam itself through the outer skin gauge 110, this action being assisted by the radially outwardly lower flange 114 of the gauge. The knives swivel about the contour pivot 46 to accommodate them to the action of the skin gauge 110. The lower edge of the mill cut knife M begins to make an undercut along the line 200, and the juice cut knife J begins to make a simultaneous undercut along the line 202. The blades and the gauge are so positioned so that the depth of the undercut line 200 is sufficient to remove the skin of the pineapple and produce the mill cut, whereas the depth of the undercut line 202 represents a depth of cut sufficiently to remove the eyes of the pineapple and produce the juice cut.

Figure 13:
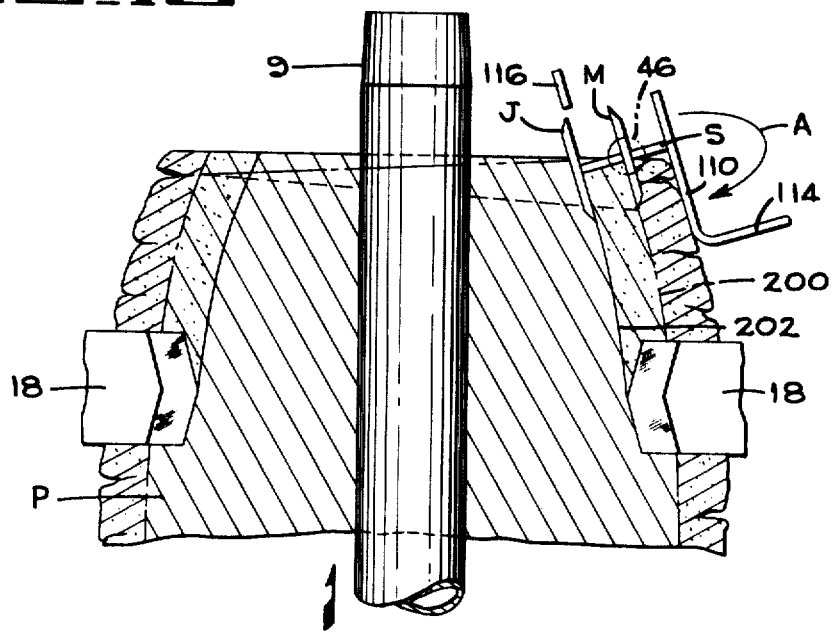

FIG. 13 shows the condition at the beginning of the peeling operation after the peeling head has been rotated by one turn. The skin gauge 110 has adjusted the blades about the contour axis pin 146 and the lower halves of the mill and juice cut knife M and J have performed their respective undercutting operations. The slitting knife S is just starting to slit into the pineapple in a somewhat horizontal plane to remove the peel.

FIG. 14 shows the action after another complete turn of the peeling head. The upper halves of the mill and juice cut knives have followed in the undercuts made by the lower halves as shown in FIG. 13, and the slitting knife S is removing the mill and juice cuts which are discharged back through the discharge assembly 54 as previously described and as shown in FIG. 11. The inner gauge 116 bears against the peeled flesh of the pineapple and assists the outer gauge 110 in orienting the knives to follow the contour of the pineapple about the contour pin 46.

FIG. 15 shows the condition after another revolution of the peeling head with a peeled pineapple body exposed and fully receiving the inner gauge 116 and with the mill and juice cuts being removed by the blades as previously described. Of course the action herein illustrated continues throughout the axial extent of the pineapple.

CUT DISCHARGING OPERATION

FIGS. 16 to 21a are diagrammatic step-by-step views of the cut discharging operation. In FIGS. 16 and 16A the cutting operation is taking place and the mill cut is being discharged along the guide 172 beneath the rotating plate 192 and the cuts are ready to be swept along the fixed barrel 22 by the vertical partition 188. Similarly the juice cut is being directed up the incline plate 182 by means of the guide 176 as previously described. The assembly 180 has not been rotated into position in front of the opening 24 of the barrels 22.

In FIGS. 17 and 17A rotation of the peeling head has continued and the mill cut pieces beneath the plate 192 are just reaching the opening 24.

In FIGS. 118 and 18A the peeling head has rotated so that the rotating mill cut pieces fly out the opening 24 by centrifugal force. The cuts have been caused to rotate by the rotating peeling head and the partition 188 and hence have an angular momentum which causes them to fly radially out of the opening 24 and onto the chute 26 for delivery to the conveyor 28 as seen in FIG. 6. The juice cut pieces are still being swept around the fixed barrel 22 by the frictional force and by the trailing partition 184. These cuts have not yet reached the opening 24 and hence are radially restrained against centrifugal force by the barrel wall 72.

In FIGS. 19 and 19A, discharge of the mill cut pieces has been completed for this revolution of the head because the mill cut peels now being flung out by the peeling head strike the wall of the barrel 22 and hence will be swept around with the peeling head for the rest of the revolution, with the assistance of the partition 188 as required. The juice cut peels are approaching the opening 24 due to friction and the action of the partition 184, and are being rotated by the peeling heads so that they have an angular momentum.

In FIGS. 20 and 20A the plate 182 and the vertical partition 184 are now positioned in front of the opening 24 so that the juice cut peels will discharge through that opening onto the conveyor 27 (FIG. 6). The mill cuts are being carried around the barrel 22 friction with the lower plate and by the vertical partition 188 as previously described.

In FIGS. 21 and 21A the partition 184 has passed the opening 24 and the juice cut peels now emerging are being picked up by the partition 184 to be carried around the peeling head barrel 22 for discharge as previously described. As mentioned, the discharge guide assembly 54, connected to the peeling knife assembly can move relative to the peel discharge assembly 180 in accordance with the pineapple diameter contour. However, the parts are designed so that the range of swinging motion of the discharge assembly 54 about the axis of pin 44 (FIG. 3) and relative to the throat assembly 180, is small enough so that the action shown in FIGS. 16 to 21A always takes place during the peeling of pineapples having a predetermined size range.

PREFERRED DESIGN AND GEOMETRY

FIG. 22 is a schematic but proportionately scaled diagram showing details of the preferred construction and geometry of the peeling arm and peeling blades previously described. The contour and helix blade arm axes are shown on the diagram as rotated about the radius axis for three sized pineapples, a small pineapple P1, a medium sized pineapple P2 and a large size pineapple P3. Also shown diagrammatically on the diagram are the corresponding three positions of the mill and juice cut blades M and J. Various radii and offsets of the axes on the diagram in small letters and typical dimensions of a preferred embodiment of the invention are given under a table entitled "Preferred Dimensions" at the upper left of FIG. 22. It will be noted in this regard that the radii of curvature $r$ of the mill and juice cut blades are the same and that this radius is such that the juice cut blade follows the contour of the intermediate sized pineapple P2. This construction is selected as providing optimum overall operation over a varied size range of pineapples. It is believed that the diagram of FIG. 22 is self-explanatory and a detailed description thereof is not required. In this diagram, the center of the axis of rotation of the peeling head, which substantially coincides with the center of the pineapples, is indicated at C.

Although the best mode contemplated for carrying out the present invention has been herein shown and described, it will be apparent that modification and variation may be made without departing from what is regarded to be the subject matter of the invention.

What I claim is:

1. A peeling head for the skin and mill cut contour peeling of pineapples, said head having a base portion providing an opening through which the fruit can pass for peeling, means for holding the fruit against rotation during peeling, a driven rotor on said base portion having a pivot to one side of said opening, a knife arm on said pivot having a knife mounting leg extending across said opening, and spring means for urging said knife arm inwardly toward the fruit; the improvement being said peeling head wherein superposed tandem knives are mounted at the end of said knife leg for simultaneously making the mill and juice cuts along substantially the same radius, said knives having diverging trailing extensions for separating the cuts.

2. The peeling head of claim 1, wherein the cutting edges of said knives are formed by intersecting wedge and arcuate surfaces with the mill cut knife wedge surface being the radially outer surface and with the juice cut knife wedge surface being the radially inner surface.

3. The peeling head of claim 1, wherein said knives are intersected at substantially 90° by a common peel slitting knife.

4. The peeling head of claim 3, wherein said tandem knives are mounted on said knife leg by a tangential pivot the axis of which intersects the junction of said common peel slitting knife with said mill cut knife.

5. The peeling head of claim 4, wherein gauges are mounted on said knife mounting leg on opposite sides of said tangential pivot axis, one of said gauges engaging the skin of the fruit adjacent the mill cut knife, the other engaging the peeled body of the fruit against the juice cut knife.

6. The peeling head of claim 3, wherein said knives have wedge-shaped cutting edges the wedge surfaces of which are on opposite sides for balancing out radial cutting forces.

7. A peeling head for skin and mill cut contour peeling pineapples, said head having a horizontal base portion providing an opening through which the fruit can pass for peeling, a peel confining barrel on said base portion having discharge means formed therein, means for holding the fruit against rotation during peeling, a driven rotor on said base portion having a pivot to one side of said opening, a knife arm on said pivot having a knife mounting leg extending across said opening, and spring means for urging said knife arm inwardly toward the fruit; the improvement being said peeling head wherein superposed tandem knives are mounted at the end of said knife leg for simultaneously making the mill and juice cuts along substantially the same radius, said discharge means consisting of a single opening in said barrel for both the mill and the juice cuts, superposed external delivery chutes for said cuts leading from said opening, a vertically partitioned, split-level discharge throat assembly mounted on said rotor and diverging trailing extensions of said knives leading to said discharge throat assembly.

8. The method of peeling pineapples or the like comprising the steps of cutting away the skin as a narrow helical strip, and removing the eyes as a narrow, helical juice cut strip, said juice cut being made by cutting into the flesh of the fruit directly under and simultaneously with the skin cutting operation.

9. The method of claim 8, including the steps of simultaneously guiding the removed skin and juice cut strips in divergent paths as the strips leave the fruit.

UNITED STATES PATENT OFFICE
CERTIFICATE OF CORRECTION

Patent No. 3,583,457            Dated June 8, 1971

Inventor(s) LESLIE VADAS

It is certified that error appears in the above-identified patent and that said Letters Patent are hereby corrected as shown below:

Column 3, line 41, change "19" to --10--.
      Column 4, line 14, change "4" to --48--.
      Column 8, line 42, change "118" to --18--.

Signed and sealed this 30th day of November 1971.

(SEAL)
Attest:

EDWARD M. FLETCHER, JR.        ROBERT GOTTSCHALK
Attesting Officer                Acting Commissioner of Patents